United States Patent [19]

Parsons et al.

[11] Patent Number: 4,473,875
[45] Date of Patent: Sep. 25, 1984

[54] INDUCTIVE STORAGE PULSE CIRCUIT DEVICE

[75] Inventors: William M. Parsons; Emanuel M. Honig, both of Los Alamos, N. Mex.

[73] Assignee: The United States of America as represented by the United States Department of Energy, Washington, D.C.

[21] Appl. No.: 574,207

[22] Filed: Jan. 27, 1984

Related U.S. Application Data

[63] Continuation of Ser. No. 341,374, Jan. 21, 1982, abandoned.

[51] Int. Cl.³ .................................................. H02M 7/00
[52] U.S. Cl. ..................................... 363/124; 323/224; 323/222; 307/106
[58] Field of Search ....................... 363/27–28, 363/96, 124, 135, 136, 138, 128–129; 323/222, 224; 307/106, 107, 108

[56] References Cited

U.S. PATENT DOCUMENTS

| 3,215,925 | 11/1965 | Rieke | 323/222 |
| 3,390,305 | 6/1968 | Greenwood et al. | 361/4 |
| 4,030,020 | 6/1977 | Korb | 363/135 |
| 4,168,477 | 9/1979 | Burchall | 323/222 |

FOREIGN PATENT DOCUMENTS

| 657543 | 4/1979 | U.S.S.R. | 323/222 |

Primary Examiner—Peter S. Wong
Attorney, Agent, or Firm—Leonard C. Brenner; Paul D. Gaetjens; Michael F. Esposito

[57] ABSTRACT

Inductive storage pulse circuit device which is capable of delivering a series of electrical pulses to a load in a sequential manner. Silicon controlled rectifiers as well as spark gap switches can be utilized in accordance with the present invention. A commutation switching array is utilized to produce a reverse current to turn-off the main opening switch. A commutation capacitor produces the reverse current and is initially charged to a predetermined voltage and subsequently charged in alternating directions by the inductive storage current.

8 Claims, 11 Drawing Figures

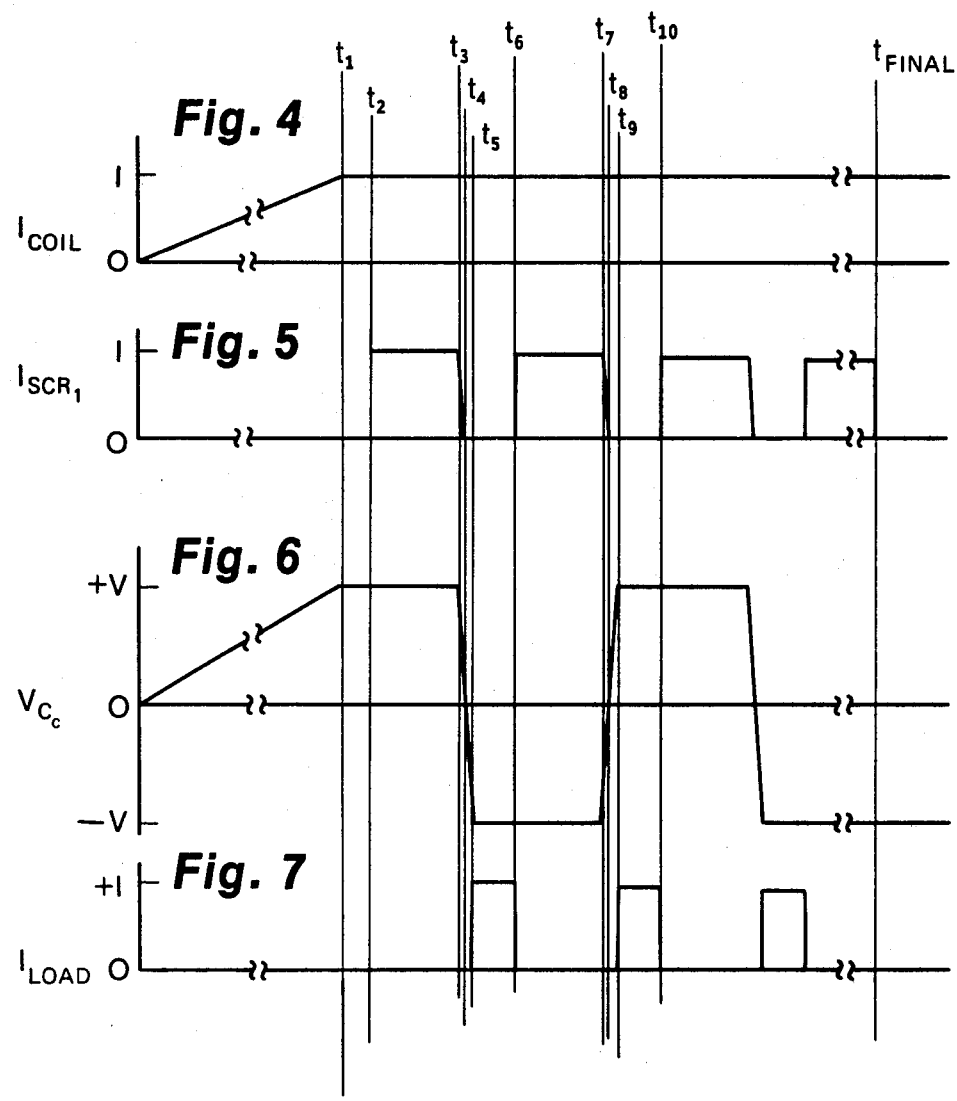

INDUCTIVE STORAGE PULSE CIRCUIT DEVICE

This invention is the result of a contract with the Department of Energy (Contract No. W-7405-ENG-36).

This is a continuation of application Ser. No. 341,374 filed Jan. 21, 1982, abandoned.

BACKGROUND OF THE INVENTION

The present invention pertains generally to pulse circuit devices and more particularly to inductive storage pulse circuit devices.

With the advent of pulse lasers and other such devices which require electrical pulse energy for operation, the requirements for a device capable of producing repetitive high power pulses of electrical energy have increased greatly. In applications where pulse power is needed for a limited period, energy storage systems have many practical advantages over continuous duty power sources. The high energy storage density of inductors (2–20 MJ/m$^3$) versus the energy storage of capacitors (0.2 MJ/m$^3$) is the controlling factor favoring inductive storage systems over capacitive storage systems, particularly for large scale applications where size, weight, and cost are overriding considerations.

Utilization of inductively stored energy normally requires the interruption of a charging current with an opening switch, as illustrated in FIG. 1. FIG. 1 schematically illustrates a simplified inductive energy storage and transfer system. The power supply 10 which is usually a relatively low voltage power supply, charges the energy storage coil 12 through switch 14 to a peak current level $I_0$. Switch 14 must be capable of carrying the coil current during the charge and hold times with low dissipation. To cause the current to transfer to the load 16, switch 14 must be rapidly opened to rapidly increase its impedance to a value much greater than the impedance of load 16. After transfer of energy from the switch 14 to the load 16, the opening switch must withstand the recovery voltage generated by the load. For repetitive operation, the switch must close again to terminate each output pulse and then repeat the opening/closing cycle. The obtainable pulse rise time, pulse width, and pulse repetition rate are all dependent upon the operational characteristics of switch 14. Since requirements for pulse circuit devices have increased dramatically, it is desirable to control these parameters separately to provide desired pulse wave characteristics at high power levels.

To achieve the desired parameters regarding pulse repetition frequency, pulse rise time, etc., prior art devices have attempted to improve the characteristics of opening switch 14 illustrated in FIG. 1. A number of these prior art methods are disclosed in the Proceedings of the Workshop on Repetitive Opening Switches (Jan. 28–30, 1981, Durango, Colo.) published Apr. 20, 1981. Some of the methods disclosed of achieving repetitive energy transfers include the use of a dense plasma focus switch, an electron beam controlled switch, a magnetically controlled vacuum arc switch, and multiple fused or explosively actuated switches. The dense plasma focus switch suffers from loss of control once operation is initiated, erratic self-triggering, a high conduction drop, and a minimum current level required for operation. The electron beam controlled switch suffers from a high conduction drop and the requirement of an external electron beam source. The vacuum arc switch suffers from high switch dissipation during interruption, the requirement of an external magnetic field source, and apparent difficulty in scaling to much higher power levels. Fuses and explosively actuated switches suffer from the obvious requirement of the necessity for an additional element for each output pulse desired.

SUMMARY OF THE INVENTION

It is therefore an object of the present invention to provide a pulse circuit device.

It is also an object of the present invention to provide an inductive storage pulse circuit device.

Another object of the present invention is to provide an improved inductive storage pulse circuit device.

Another object of the present invention is to provide a pulse circuit device for delivering electrical pulses to a load.

Another object of the present invention is to provide a circuit device for delivering electrical power pulses to a load.

Another object of the present invention is to provide a pulse circuit device for delivering electrical pulses to a load such that pulse rise time, pulse width, and pulse repetition frequency can be controlled independently.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus of this invention may comprise a pulse circuit device for delivering electrical pulses to a load comprising: an inductive storage device; a power supply for generating a charging current, said power supply connected to said inductive storage device; first switch means for applying said charging current to said inductive storage device in a predetermined direction to charge said inductive storage device; an array of commutation switches connected in parallel to said first switch means; a commutation capacitor connected to said array of commutation switches; means for controlling said array of commutation switches to discharge said commutation capacitor through said first switch means in a direction opposite to said predetermined direction to generate zero current in said first switch means to turn-off said first switch means; second switch means connected to said inductive storage device and said load for delivering electrical pulses to said load when said first switch means is turned-off; whereby said second switch means controls the risetime and said array commutation switches controls the pulse repetition frequency of said electrical pulses.

The present invention may also comprise, in accordance with its objects and purposes, a circuit device for delivering electrical power pulses to a load comprising: power supply means for generating electrical power; an inductive storage device connected to said power supply means; first switch means connected to said inductive storage device and said power supply; two sets of commutation switches connected in parallel to said first switching means; capacitive storage means connected between said two sets of commutation switches for delivering a reverse current to said first switch means to turn-off said first switch means whenever at least one set of said commutation switches are turned-on; second switch means for delivering an electrical power pulse from said inductive storage device to said load each time said first switch means is turned-off.

The advantages of the present invention are that pulse rise time, pulse width, and pulse repetition frequency can be controlled independently in accordance with the preferred embodiment of the invention within the switching characteristics of separate circuit elements utilized in the device of the present invention. Additionally, the present invention provides a unique switching arrangement utilizing conventional circuit elements which can provide high output power pulses not previously obtainable.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 4 is a graph illustrating coil current versus time.

FIG. 5 is a graph illustrating current through silicon controlled rectifier 24 illustrated in FIG. 2 versus time.

FIG. 6 is a graph of voltage across commutation capacitor 34 versus time.

FIG. 7 is a graph of current delivered to load 38 versus time.

DETAILED DESCRIPTION OF THE PREFERRED EMBODIMENT OF THE INVENTION

Figure 1:
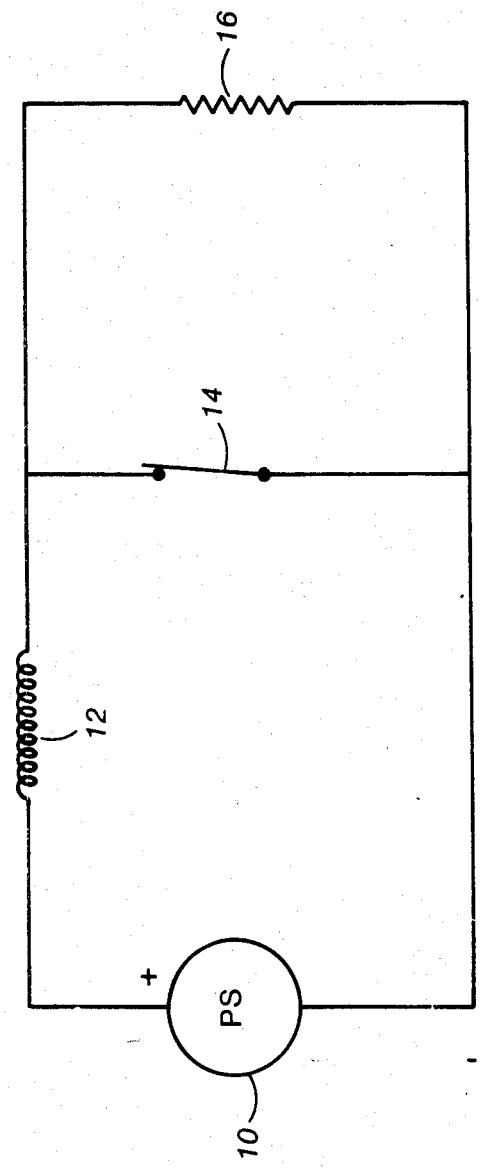
FIG. 1 is a schematic illustration of a conventional inductive storage pulse circuit device.
Figure 2:
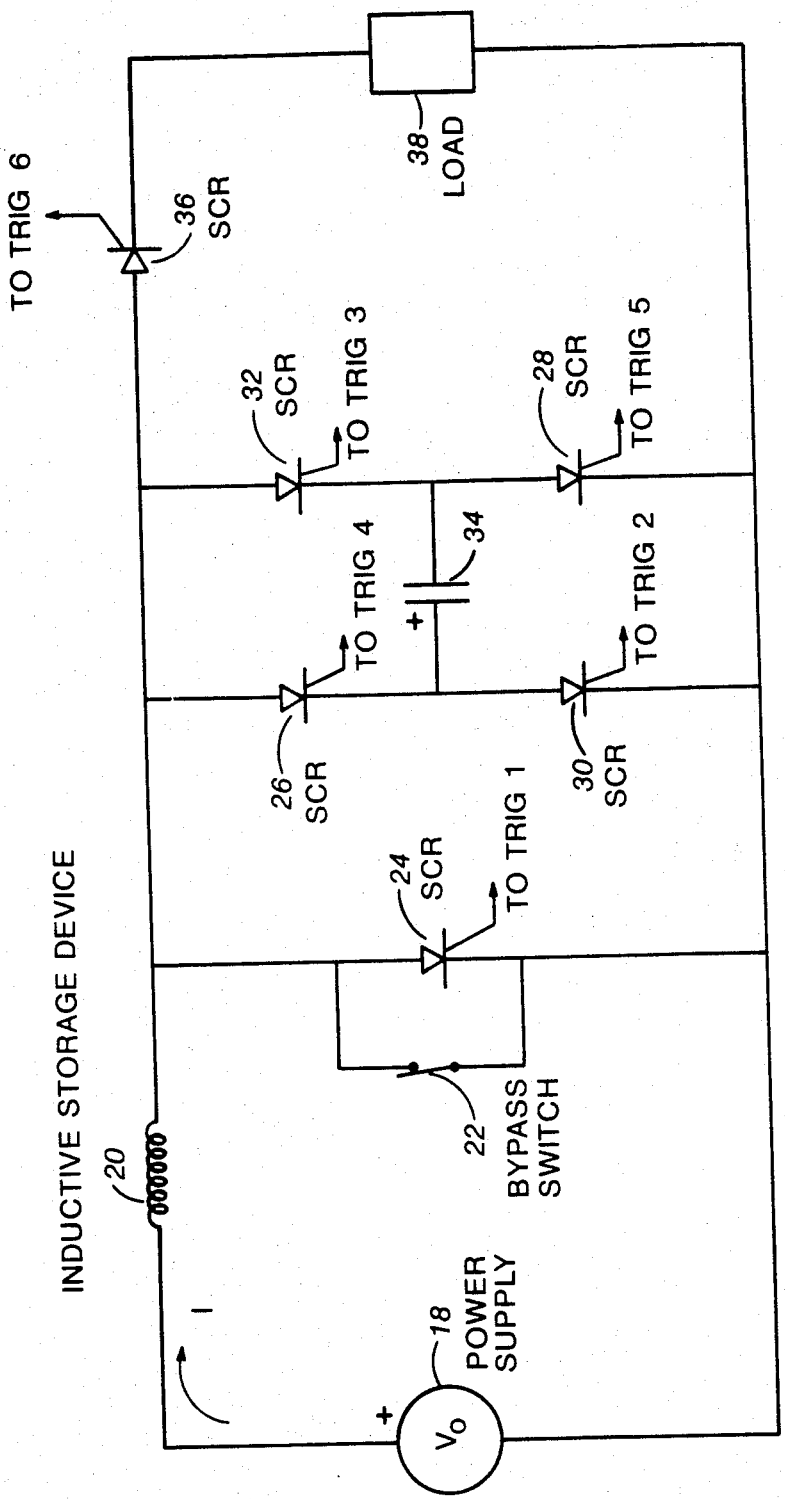
FIG. 2 is a schematic illustration of the pulse circuit device of the present invention.

FIG. 2 schematically discloses the circuitry of the pulse circuit device of the present invention. The present invention is also disclosed in Los Alamos National Laboratory unclassified report LA-UR-81-269 which was published in the Proceedings of the Workshop on Repetitive opening switches (Jan. 28-30, 1981, Durango, Colo.) Apr. 20, 1981 which is hereby incorporated by reference for all that it teaches. As illustrated in FIG. 2, under initial conditions all switches are open with the exception of bypass 22 which is closed. Power supply 18 charges the inductive storage device 20 which may comprise a superconducting, cryogenic, or conventional coil device. The inductive storage device 20 is charged to a current level I through bypass switch 22. Simultaneously, an additional power supply (not shown) charges commutation capacitor 34 to a predetermined voltage V. After a steady state condition is reached, bypass switch 22 is opened at the same time silicon controlled rectifier 24 is triggered so that the current I is transferred entirely to silicon controlled rectifier 24. Once the current I is established through silicon controlled rectifier 24 and the voltage V is established on commutation capacitor 34 in the direction illustrated in FIG. 2, silicon controlled rectifiers 30 and 32 are triggered to discharge commutation capacitor 34 through silicon controlled rectifier 24 in a direction opposite to the inductive storage device current I. The charge on commutation capacitor 34 is sufficient to cause a net current zero in silicon controlled rectifier 24 so that interruption occurs and silicon controlled rectifier 24 is turned-off. The inductor current I is then caused to flow through silicon controlled rectifiers 32 and 30 causing commutation capacitor 34 to be charged in the opposite direction to a predetermined voltage V. When commutation capacitor 34 reaches $-V$, silicon controlled rectifier 36 is triggered to produce a high rate of voltage rise in load 38. The full inductor current I now flows through load 38 with a risetime determined by the switching time of silicon controlled rectifier 36. When it is desired to terminate the pulse delivered to load 38, silicon controlled rectifier 24 is triggered to provide a lower resistance path of conduction. This same sequence is then repeated with the exception that silicon controlled rectifiers 26 and 28 are triggered at the appropriate time due to the reverse charge on commutation capacitor 34. Similarly, on the third sequence, commutation silicon controlled rectifiers 30 and 32 are used since commutation capacitor 34 will again be forward charged after the second sequence. This procedure continues for the desired number of pulses to be delivered to load 38. To terminate this procedure, silicon controlled rectifier 24 is triggered and bypass switch 22 is then closed.

Figure 3:
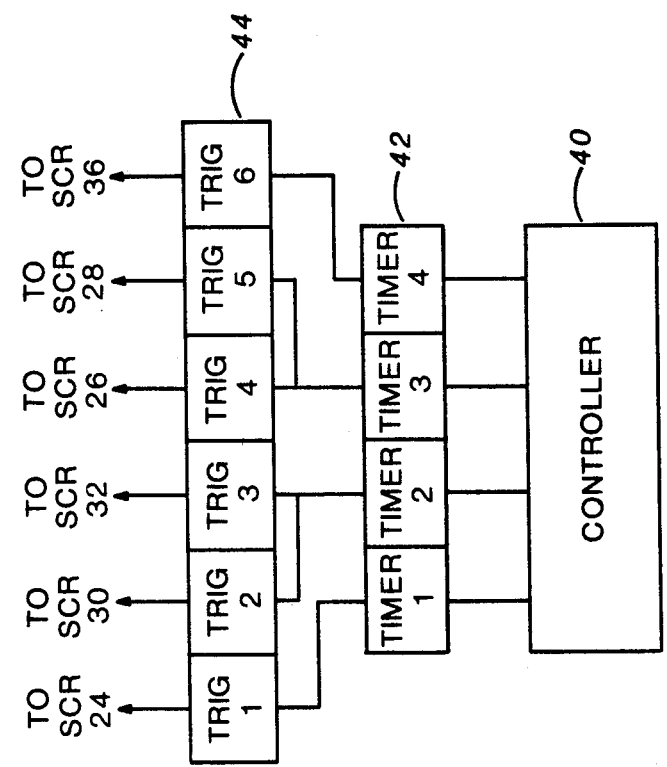
FIG. 3 is a schematic illustration of the control circuitry for the device of FIG. 2.

FIG. 3 illustrates the circuitry for controlling the trigger pulses of the silicon controlled rectifiers of FIG. 2. Controller 40 provides activation pulses for timers 42 which in turn activate trigger pulse circuitry 44. Trigger circuitry 44 can employ pulse transformers to enhance pulse triggering.

FIG. 4 illustrates the current flowing through inductive storage device 20 versus time. At time $t_0$ power supply 18 is turned-on to charge the inductive storage device 20. At time $t_1$, a current I is produced in inductive storage device 20. At this point, power supply 18 may be removed or turned-off and can be replaced by an additional bypass switch (not shown). At time $t_2$ bypass switch 22 is opened and silicon controlled rectifier 24 is triggered via timer 1 and trigger 1, illustrated in FIG. 3. At time $t_3$, silicon controlled rectifiers 30 and 32 are turned-on via timer 2 and trigger 2 and trigger 3, illustrated in FIG. 3. At time $t_4$, silicon controlled rectifier 24 turns-off automatically from the reverse current produced by commutation capacitor 34. At time $t_5$ silicon controlled rectifier 36 is turned-on via timer 4 and trigger 6. Additionally, silicon controlled rectifiers 30 and 32 turn-off automatically due to a lack of current flowing through them. At time $t_6$ silicon controlled rectifier 24 is again triggered via timer 1 and trigger 1 to cause current I from the inductive storage device to flow through the silicon controlled rectifier 24 and, consequently, end the pulse delivered to load 38. At time $t_7$, silicon controlled rectifiers 26 and 28 are triggered via timer 3 and, triggers 4 and 5, causing a reverse current to flow through silicon controlled rectifier 24, thereby causing silicon controlled rectifier 24 to turn-off at time $t_8$. At time $t_9$, silicon controlled rectifier 36 is triggered via timer 4 and trigger 6 and silicon controlled rectifiers 26 and 28 turn-off automatically due to a lack of current flowing through them. At time $t_{10}$, silicon controlled rectifier 24 is triggered via timer 1 and trigger 1 to repeat the same process. This process then repeats itself from time $t_3$ until termination at which time bypass switch 22 is placed in the closed position.

FIG. 5 illustrates the current flowing through silicon controlled rectifier 24 at the various times described above. Similarly, FIG. 6 shows the voltage charge on commutation capacitor 34 at the various times described above. FIG. 7 illustrates the current produced in load 38 at the various times described.

Figure 9:
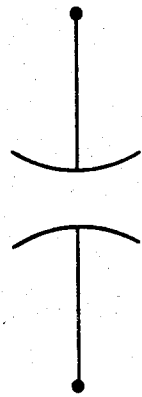
FIG. 9 is a schematic illustration of a self-breakdown spark gap switch which can be utilized in place of silicon controlled rectifier 36 illustrated in FIG. 2.
Figure 8:
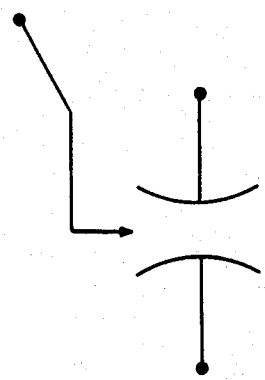
FIG. 8 is a schematic illustration of a spark gap switch which can be utilized in place of the silicon controlled rectifiers illustrated in FIG. 2.

FIG. 8 is a schematic illustration of a spark gap switch which can be utilized in place of any one of the silicon controlled rectifiers 24 through 32 and 36, illustrated in FIG. 2. The spark gap switch illustrated in FIG. 8 operates in essentially the same manner as the silicon controlled rectifier in that a trigger voltage is necessary to cause conduction and a minimal current is required to maintain conduction. FIG. 9 is a schematic illustration of a self-breaksown spark gap switch which can be utilized in place of silicon controlled rectifier 36 illustrated in FIG. 2. Such a switch can reduce the required control circuitry illustrated in FIG. 3.

Figure 11:
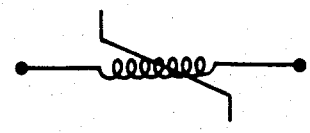
FIG. 11 is a schematic illustration of a saturable reactor used to improve the turn-on and turn-off capabilities of the silicon controlled rectifiers illustrated in FIG. 2.
Figure 10:
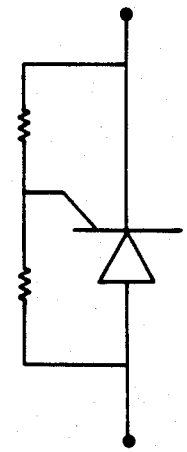
FIG. 10 is a schematic illustration of a self-breakdown silicon controlled rectifier which can be utilized in place of silicon controlled rectifier 36 illustrated in FIG. 2.

FIG. 10 similarly illustrates a self-breakdown silicon controlled rectifier which can also reduce the amount of control circuitry illustrated in FIG. 3. FIG. 11 schematically illustrates a saturable reactor which can be connected in series with any of the silicon controlled rectifier switches illustrated in FIG. 2 or other switches disclosed herein to enhance the switching capabilities of these devices.

The present invention therefore provides a circuit which is capable of efficiently transforming magnetic energy stored in an inductive storage device into rapid, fast rise time pulses of direct current. The system may be run in a continuous mode as well as an intermittent mode with a prescribed number of pulses in each intermittent pulse train. Again, the inductive storage device may be superconducting, cryogenic, or a conventional inductive device. Due to the nature of the present invention, the load 38 may be resistive, capacitive, or inductive. If the load 38 is inductive, a transfer capacitor can be placed in parallel with the load. The present invention also allows the pulse width, pulse risetime, and pulse repetition frequency to be varied using separate circuit components to match the desired application. Presently available silicon controlled rectifiers allow the repetition rate to be as high as 20 kHz for high power applications and much higher frequencies at lower power levels. Moreover, high voltages and currents can be achieved by utilizing arrays of silicon controlled rectifier's, such as disclosed in the above-referenced Proceedings of the Workshop on Repetitive Opening Switches. Consequently, the present invention can provide high power pulses which can be controlled with regard to initiation time, pulse width, interval between pulses, and termination time. The pulse repetition rate can range from zero to a value limited by the repetition rate of the opening switch. The output pulse risetime is independent of the opening switch risetime limits. The commutation capacitor is recharged from the inductive energy storage device just prior to each output pulse. Therefore, the commutation capacitor is ready, regardless of the characteristics of the load, to commutate the opening switch for each succeeding output pulse.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A pulse circuit device for delivering electrical pulses to a load comprising:
   an inductive storage device;
   a power supply for generating a charging current, said power supply connected to said inductive storage device;
   first switch means for applying said charging current to said inductive storage device in a predetermined direction to charge said inductive storage device;
   an array of commutation switches connected in parallel to said first switch means;
   a commutation capacitor connected to said array of commutation switches;
   means for controlling said array of commutation switches to discharge said commutation capacitor through said first switch means in a direction opposite to said predetermined direction to generate zero current in said first switch means to turn-off said first switch means;
   triggerable switch means connected to said inductive storage device and said load for delivering electrical pulses to said load when said first switch means is turned-off;
   whereby said triggerable switch means controls the risetime and said array commutation switches controls the pulse repetition frequency of said electrical pulses.

2. The device of claim 1 further comprising means for controlling said first switch means to regulate the pulse width of said electrical pulses.

3. The device of claim 1 wherein said first switch means comprises at least one silicon controlled rectifier.

4. The device of claim 1 wherein said first switch means comprises at least one spark gap switch.

5. A circuit device for delivering electrical power pulses to a load comprising:
   power supply means for generating electrical power;
   an inductive storage device connected to said power supply means;
   first switch means connected to said inductive storage device and said power supply;
   two sets of commutation switches connected in parallel to said first switching means;
   capacitive storage means connected between said two sets of commutation switches for delivering a reverse current to said first switch means to turn off said first switch means whenever at least one set of said commutation switches are turned-on;
   triggerable switch means for delivering an electrical power pulse from said inductive storage device to said load each time said first switch means is turned-off.

6. The device of claim 5 further comprising means for controlling said first switch means to regulate the pulse width of said electrical pulses.

7. The device of claim 5 wherein said first switch means comprises at least one silicon controlled rectifier.

8. The device of claim 5 wherein said first switch means comprises at least one spark gap switch.

* * * * *